United States Patent [19]

Moore, Jr.

[11] 3,754,946

[45] Aug. 28, 1973

[54] REFRACTORY LAMINATE BASED ON NEGATIVE SOLS OR SILICATES AND NON-POLYMERIC ORGANIC CATIONIC NITROGEN-CONTAINING COMPOUNDS

[75] Inventor: Earl P. Moore, Jr., Wilmington, Del.

[73] Assignee: E. I. du Pont de Nemours and Company, Wilmington, Del.

[22] Filed: June 1, 1971

[21] Appl. No.: 148,964

[52] U.S. Cl.............. 106/38.35, 106/38.3, 117/29, 117/62, 117/70 D, 164/26
[51] Int. Cl............................................ C04b 35/14
[58] Field of Search................. 161/162, 193, 206; 117/16, 29, 33, 62, 70 D; 164/26, 34, 41, 15, 24; 106/38.3, 38.35, 286, 38.27, 38.9; 252/313 S

[56] References Cited
UNITED STATES PATENTS

| | | | |
|---|---|---|---|
| 3,292,220 | 12/1966 | Emblem et al. | 106/38.35 |
| 3,165,799 | 1/1965 | Watts | 106/38.35 |
| 3,396,775 | 8/1968 | Scott | 164/26 |
| 3,024,125 | 3/1962 | Lee | 106/38.35 |
| 3,012,973 | 12/1961 | Atkins | 106/286 |
| 2,892,797 | 6/1959 | Alexander et al. | 252/313 |
| 2,750,345 | 6/1956 | Alexander | 252/313 |
| 2,574,902 | 11/1951 | Bechtold et al. | 252/313 |
| 2,577,485 | 12/1951 | Rule | 252/313 |
| 3,232,771 | 2/1966 | Pearce | 106/38.35 |

Primary Examiner—Daniel J. Fritsch
Attorney—Don M. Kerr

[57] ABSTRACT

A rapid process for forming a refractory laminate on the surface of a support structure which comprises dipping the structure in a bath comprising a sol of negatively charged colloidal particles of an inorganic substance and/or a solution of an alkaline ionic silicate to form a coating on the surface, contacting the coated surface with a non-polymeric nitrogen-containing cationic organic setting agent to firmly set the negative sol or silicate solution. This procedure is repeated until a laminate of the desired thickness is built up on the surface. In order to increase the rate of laminate build-up particulate refractory material can be included in the bath and/or the coated surface can be stuccoed between dips. Interaction between the negatively charged colloidal particles or silicate and the cationic organic setting agent results in the polymerization of the colloid or silicate and thereby the immobilization of the coatings. This technique makes it possible to successively apply and set coatings to built refractory laminates in very short times without intermediate drying and without sloughing of coats. The process is particularly suited for making expendable, refractory shell molds for precision investment casting of metals by the so-called "lost-wax" technique.

14 Claims, No Drawings

REFRACTORY LAMINATE BASED ON NEGATIVE SOLS OR SILICATES AND NON-POLYMERIC ORGANIC CATIONIC NITROGEN-CONTAINING COMPOUNDS

CROSS-REFERENCE TO RELATED APPLICATIONS

This application is a continuation-in-part of my copending application Ser. No. 49,911, filed Jun 25, 1970, now abandoned.

BACKGROUND OF THE INVENTION

This invention relates to the process for forming refractory laminates. The process is useful for a variety of purposes but it was developed for and is particularly suited to the manufacture of expendable, refractory shell molds for precision investment casting of metals by the "lost-wax" or disposable pattern technique.

Refractory shell molds for precision investment casting are usually prepared by dipping a disposable pattern, which is a replica of the part to be cast, into a refractory slurry consisting of a suspension of fine refractory grain in a bonding liquid. The disposable pattern is usually wax or plastic and is solvent cleaned prior to dipping into the slurry. Other disposable materials such as low-melting tin-bismuth alloy and frozen mercury are sometimes employed for the pattern. The binder is generally capable of hardening during drying at room temperature. After dipping, the excess slurry is drained from the coated pattern and while the coating is still wet it is stuccoed with coarser refractory particles. The stuccoing is carried out by dipping the coated pattern into a fluidized bed of the refractory particles or by sprinkling the particles onto the pattern. The process of dipping and stuccoing is repeated until a refractory shell having sufficient thickness to resist stresses incurred in subsequent casting operations is built up around the pattern. The usual thickness of the shell is from one-eighth to one-half inch although thinner or thicker shells may be produced. The completed pattern is usually dried under ambient conditions for 24 hours. The disposable pattern is then usually removed from the refractory shell mold by flash dewaxing furnaces, steam autoclaves, or boiling solvent baths. The refractory shell mold is then fired at 1700°–1900°F. to prepare it for metal casting.

In this conventional manner of making refractory shell molds the period of drying between coating applications may vary from 30 minutes to 4 hours depending on temperature, humidity, air flow and complexity of the pattern. This greatly increases the time and cost involved in making the molds. The drying problem is particularly difficult in recessed areas or "blind" cores (hollow openings, closed at one end). These refractory molds may dry only after many hours, since much of their surface area is not suitably disposed to drying by the atmosphere. Drying is necessary to harden the slurry coatings and to insure that subsequent coats will adhere to previous ones without sloughing away.

Another shortcoming of the conventional method of making shell molds is that when the slurry is dried microfractures often occur on hardening. When the next slurry coating is applied the binder in the slurry may flow through the stucco and either dissolve the slurry coating in part or cause it to flake.

Because of these short comings of the conventional mold forming processes, efforts have been made to develop chemical methods for rapid setting of the binder coatings, in order to eliminate the requirement of drying between dips and reduce the time interval between dips to a few minutes. One approach has been to use a gaseous reactant in order to set the binder. U.S. Pat. No. 2,829,060 discloses the use of carbon dioxide to set sodium silicate-bonded shells containing ammonia. U.S. Pat. No. 3,455,368 discloses the use of ammonia gas to set hydrolyzed ethyl silicate or acidified aqueous colloidal silica-bonded shells. U.S. Pat. No. 3,396,775 discloses the use of volatile organic bases in order to set shells bonded with hydrolyzed ethyl silicates. Volatile solvents and gaseous ammonia present ventilation problems to the foundry. These problems have contributed to the slow acceptance of these fast-setting systems.

Another approach has been to use an acidified aqueous colloidal silica to gel a basic colloidal silica and vice versa. In this approach both binders are negatively charged and gelation occurs because of pH changes. This system is described in a paper by Shipstone, Rothwell and Perry, "Drying Ceramic-Shell Moulds," British Investment Casters' Technical Association, 9th Annual Conference. However, systems based on gelling due to pH changes have not found wide spread acceptance because gelation is slow and the resulting wet gels are weak. This gives rise to sloughing-off of the early coats during subsequent dipping.

A third rapid setting approach in the art employs sodium silicate as the binder and mono-ammonium phosphate and magnesium oxide are in the stucco as a gelling agent. This is described in an article by Dootz, Craig, and Peyton, "Simplification of the Chrome-Cobalt Partial Denture Casting Procedure," J.Prosthetic Dentistry, Vol. 17, No. 5, pages 464–471, May 1967.

A fourth approach employs an ethyl silicate dip coat which is set with aqueous colloidal silica containing ammonia. This is disclosed in an article by Shepherd, "Adaptation of the Ceramic Shell Mould to Meet Mass Production Requirements," British Investment Casters' Technical Association.

A fifth approach has been to add a volatile, organic solvent to the silica sol. Relatively rapid gelling is obtained by allowing the solvent (usually an alcohol) to evaporate. For a simple casting the time required for evaporation may be only several minutes, but for a complex casting evaporation may require several hours, since diffusion of solvent from deeply recessed areas or blind core areas is slow.

SUMMARY OF THE INVENTION

This invention is a rapid process for forming a refractory laminate on the surface of a support structure. The process comprises:

a. dipping the structure in a bath comprising at least one member of the group consisting of a sol of negatively charged colloidal particles of an inorganic substance and a solution of an alkaline ionic silicate to form a coating on the surface, b. contacting the coated surface with a non-polymeric nitrogen-containing cationic organic setting agent to firmly set the negative sol or silicate, and c. removing excess setting agent from the coated surface.

Steps (a) through (c) are repeated in sequence as required to build a refractory laminate of the desired thickness.

Preferably, in step (b), the coated surface is dipped into a solution or dispersion of the setting agent, although other means of contacting the coated surface with the setting agent can be used, as hereinafter described. In order to increase the rate of laminate build-up, the bath of step (a) can, and preferably does, comprise a slurry of a particulate refractory metal or inorganic compound (i.e., a refractory grain) in the negative sol or silicate solution.

As mentioned previously, the process of this invention is particularly suited to the manufacture of expendable, refractory shell molds for precision investment casting of metals. In this application of the process, a disposable pattern of the metal casting is dipped into a bath comprising a sol of negatively charged colloidal particles of an inorganic substance and/or a solution of an alkaline ionic silicate to form a coating on the pattern. Thereafter, the coated pattern is contacted with a non-polymeric nitrogen-containing cationic organic setting agent to set the negative sol or silicate solution, and excess setting agent is removed from the coated pattern. These steps are repeated in sequence as required to build a shell mold of the desired thickness. Preferably, in order to increase the rate of build-up of the ceramic shell mold, the bath of negative sol and/or silicate solution comprises a slurry of relatively fine refractory grain and/or the coated pattern is stuccoed with a relatively coarse refractory grain before being treated with the setting agent. In the most preferred embodiment two slurries of refractory grain in silica sol and/or silicate solution are used. The first bath contains relatively fine refractory grain and is used for the first or prime coat. The second contains relatively coarse refractory grain and is used for subsequent coats (back-up or follow-up coats).

This invention also includes refractory laminates and refractory laminate articles, such as shell molds, made by the above-described process. The laminates comprise superposed layers of a gel of at least one member of the group consisting of negatively charged colloidal particles of an inorganic substance and an alkaline ionic silicate, the gel containing a non-polymeric nitrogen-containing cationic setting agent. The gel layers can contain and/or be separated by intermediate layers of refractory grain.

The process of this invention is rapid because it is not necessary to dry between coats. This is particularly significant in the manufacture of refractory shell molds by the process of the invention. As soon as one coat has been stuccoed the coated pattern can be dipped into a solution of organic nitrogen-containing cationic compound. When this is done an essentially instantaneous coagulation of the coating occurs, due to chemical and electrical charge forces between the negatively charged colloidal particles or silicate and the positively charged organic cationic compound. After setting, the setting agent solution must be thoroughly drained or rinsed from the pattern in order to avoid contamination of the slurry during the following coating step. However, even allowing for removal of excess setting agent solution the process is rapid. For example, a refractory shell mold of about three-eighth inch thick can be formed within 15-45 minutes.

DESCRIPTION OF THE INVENTION

The invention will now be described in detail with particular reference to its use in forming expendable, refractory shell molds for precision investment casting of metals.

Negative Sols

Among the negative sols which can be used in this invention are silica sols composed of substantially discrete, dense, non-allomerated particles of silica dispersed in a suitable liquid medium. The concentration of silica in these sols can be as low as 5 percent and as high as 60 percent by weight. However, it is preferred that the silica content be at least 25 percent by weight. FOr the purposes of this invention, it is most preferred that the silica concentration be between 25 and 40 percent by weight.

The average diameter of the silica particles should be between about 1 and 150 millimicrons. It is preferred the the average silica particle diameter be in the range of 50-50 millimicrons and most preferred that it lie between 5 and 16 millimicrons.

The pH of the silica sol may range from 10.5 down to 7.5 or even lower with satisfactory results. The pH which is preferred is between 8.5 and 10, as in the commercial "Ludox" colloidal silica sols. However, acid silica sols can also be used. Positively charged stabilizing counter ions for the colloidal silica particles in the sols are $Na^+$, as in "Ludox" LS, HS, SM, and AM $NH_4^+$, as in "Ludox" AS, $K^+$, $Li^+$ and quaternary ammonium. Silica sols whose particle surfaces have been modified with metal oxides to enchance negative character, such as "Ludox" AM with aluminate-modified silica, are useful. Sols of negatively charged colloidal particles of inorganic substances other than silica can be used. Examples are sols of naturally occurring clays of the bentonite, attapulgite, and kaolinite types.

The liquid medium for suspending the colloidal silica particles can be water, along or mixed with low molecular weight water-miscible alcohols such as methanol and isopropanol or other polar organic liquids, or it can be one or more of these organic liquids free of water. The preferred medium for this invention is water.

ALKALINE IONIC SILICATES

Various types of basic silicates have been found suitable for the process of this invention. Thus, alkali metal silicates as aqueous solutions can be used. Useful concentrations of silicate solids expressed as $SiO_2$, can vary from 1-50 percent or higher, with only the restriction imposed by excessive viscosity limiting utility. For the purposes of this invention the preferred concentration of $SiO_2$ is 5-30 percent.

The alkali metal silicates which are useful include the sodium, potassium and lithium silicates. In the case of the sodium and potassium silicates, $SiO_2$: $Na_2 O$ and $SiO_2$:$K_2O$, molar ratios can be 2:1 or lower, up to 4:1 or higher; the preferred ratios are between 2.5:1 and 3.5:1. In the case of the lithium silicates the $SiO_2$:$Li_2O$ ratio can be 3.5:1 or less up to very high values such that the size of the molecules are well into the colloidal range.

In addition to alkali metal silicates, quaternary ammonium silicates can be used. Mixtures of alkaline ionic silicates and colloidal silicas can also be used.

Cationic Nitrogen-Containing Organic Compounds

In the preferred process of this invention a disposable pattern is first dipped into a bath comprising a sol of negatively charged colloidal silica particles and/or a basic solution of an alkaline ionic silicate, as just described, stuccoed in the conventional manner, then treated with a solution of a setting agent which is a non-polymeric nitrogen-containing cationic, organic compound. Suitable setting agents include long-chain amines and their organic and inorganic acid salts and substituted onium salts of organic and inorganic acids.

Representative of onium compounds are substituted ammonium, imonium, hydroxylammonium, diazonium, hydrazonium and guanadonium compounds. The substituents in the amines, amine salts and onium salts are hydrogen, straight or branched-chain aliphatic groups of one to 25 carbon atoms, cycloalkyl, aryl, and alkyl substituted aryl groups. The nitrogen can be part of the ring in a heterocyclic structure and there must always be present at least one and no more than two alkyl chains of six or more carbon atoms. The aliphatic substituents can, of course, be saturated or unsaturated and the longer chain substituents, containing 18 or more carbon atoms, preferably contain at least one double bond.

Suitable onium or amine or amine salt reagents can be prepared by methods well known in the art and many are commercially available.

Representative of suitable commercially available onium reagents are the following: Aliquat 7, 11, 204 and 215; Amine C; Ammonyx DME and T; Arquad 12–50, 16–50, 18–50, L–15 and 2C–50; Atlas G–263; Barquat OE–50, LPC and IB–75; Bretol; Bromat; BTC 1750; Dynafac; Fixanol VR; intexsan HB–50; Isothan Q–75; Monaquat OIBC; Monazoline M; Quatrene CB, 0–56 and SFB; Romine BTQ; SD–75; Triton X–400 and Vantoc CL.

Representative of other suitable onium coactants are the following: n-octyltrimethylammonium chloride, dodecyldimethylethylammonium bromide, tetradecyldiethylbenzylammonium ethosulfate, dicocodimethylammonium acetate, dodecylbenzyltrimethylammonium chloride and N-eicosylpyridinium bromide.

Preferred onium reagents are those in which there is an alkyl chain of between eight and 20 carbon atoms and which contain a total of between 11 and 50 carbon atoms. Representative of preferred onium setting agents are octadecyltrimethylammonium chloride, dodecyltrimethylammonium bromide, 2-pentadecyltrimethylammonium halides, hexadecyltrimethylammonium chloride, didodecyldimethylammonium acetate, lower alkyl substituted imidazolines of tetradecanoic acid, dodecylbenzyltrimethylammonium chloride, cetylpyridinium chloride, oleyl and linoleyltrimethylammonium halides, cetyltrimethylammonium halides, and the quaternary derivatives of alkyl substituted imidazolines of dodecanoic acid.

Representative of suitable commercially available amine reagents are Adogen 101–D, 140 and 160–D; Alamine 4, 5 and 6; Armeen 0, L–11 and DM–12–D; Barlene 8, 14 and 16; Diam 21; Formonyte D–801; and Hodag Amine C-100-S. Other suitable amine setting agents include primary amines such as n-octylamine and 4-hexylcyclohexylamine; secondary amines such as di-n-decylamine and ethyltetradecylamine; and tertiary amines such as p-hexadecyl-N, N-dimethylaniline.

Preferred amine reagents are those in which there is an alkyl chain of between eight and 20 carbon atoms and which contain between eight and 40 carbon atoms in total. Representative of preferred amine coactants are dodecylamine, ethylcotylamine and dimethyldecylamine.

Amine salt reagents suitable to this invention are salts of any of the above-defined and exemplified primary, secondary and tertiary amines. Acids suitable for salt formation with these amines are: inorganic acids such as Tables HBr, HI, $NH_2SO_3H$, $H_2SO_4$ and $H_3PO_4$; and a organic acids such as formic, acetic, hydroxyacetic, citric, oxolic and partially esterified $H_2SO_4$. No restriction to only these acids for this invention is intended. Any inorganic or organic acid which will react with an amine or amines above-defined and exemplified to produce a positively charged nitrogenous salt will suffice.

Preferred amine salts are those formed from the preferred amine reagents and HCl, $H_2SO_4$ and acetic acid. Representative of preferred amine salts are dodecylamine hydrochloride, dioctylamine hydrosulfate, ethyloctylamine dihydrogen phosphate and dimethyldecylamine acetate.

The cationic organic compounds may be employed as solutions or dispersions in the performance of this invention. Suitable media for preparing these mixtures are water, low molecular weight alcohols such as methanol and isopropanol and other polar organic liquids such as dimethylformamide and acetone. The preferred liquid medium for the cationic setting agents is water. Water can be combined with the other liquids in various proportions to give a medium suited to a particular compound when desired.

Concentrations of cationic organic compounds useful in carrying out this process can be as low as 1 percent and as high as 50 percent or even higher. The preferred concentration of reagent compound is 5 to 30 percent. Another method of contacting the negative sol coated pattern with setting agent is to incorporate the setting agent into the refractory grain used for stuccoing. For this purpose, the setting agent can be mixed or coated on the stucco refractory grains is clear from the foregoing discussion the non-polymeric nitrogen containing organic setting agents of this invention are monocationic setting agents.

Refractory Grain

In building shell molds in accordance with this invention, any finely divided refractory material may be used provided it does not react with the negative sol or silicate binders or the setting agents. Among suitable refractory materials are zircon, molochite, fused silica, sillimanite, mullite and alumina. To obtain castings swith a smooth surface finish, all the refractory grain in the primary or first coating composition should pass a 100-mesh sieve and preferably 85percent should pass a 200-mesh sieve. Even finer mesh refractory may be employed for better surface finish and it is preferred in most instances. In subsequent coatings the refractory may be much coarser but it is preferred that all the material pass a 100-mesh sieve. These mesh sieve numbers correspond to the Standard U.S. Sieve Series.

The refractory material used for the stucco is preferably a coarser grade of the same refractory grain used in the slurry composition. For example, if refractory in a prime coat slurry is zircon with approximately 75 percent passing the 325-mesh sieve, the refractory used for the stucco cna also be zircon in the range of -80 to 140 mesh. It is not essential, however, tha refractory material of the same composition should be used for both the stucco and the slurry. Examples of refractory material suitable for stucco are zircon, zirconia, sillimanite, mullite, fused silica, alumina and fire clay grog.

In most instances practice of this invention will involve the preparation and use of two slurries, both containing negative sol and/or silicate solution and refractory grain. One slurry will contain relatively fine refractory grain and will be used for the prime coat. The other will contain a coarser refractory grain and be used for the back-up or follow-up coats. However, it is possible to use the prime coat slurry for back-up or follow-up coats as well. In most instances, less expensive refractories are used for the back-up coats. Molochite, an aluminosilicate, is frequently used as the back-up coat for a zircon prime coat, and a slightly coarser grade of a fused silica powder is used as the back-up coat for a finer fused silica prime coat.

A discussion of the preparation of some specific slurries which are useful in the practice of this invention follows. In these slurries the colloidal silica sol is "Ludox" SM-30, a basic, aqueous silica sol which contains 30 percent colloidal silica with an average particle size of about 7 m$\mu$.

Zircon

The zircon slurries used in the zircon-molochite slurry system employ a finely ground zircon flour (No. 3 Grade from Casting Supply House). This flour is described as -325 mesh, since approximately 75 percent passes through this screen. This flour is mixed with silica sol to make a prime coat slurry. The resulting coatings are very smooth, dense and inert to molten metals and alloys and possess good thermal stability to 2,500°F. and above.

In making the slurry the refractory flour is added to the silica sol and to any additional water, if needed, while mixing. A propeller-type agitator is suitable for this purpose. Slurry equilibrium is usually reached after a few hours of agitation, although high shear mixing of a new batch is not recommended because of overheating. The combination of low slurry viscosity and zircon's high density can cause the gain to settle out unless sufficient agitation is maintained. The best slurry working temperature is 75°-85°F. After mixing is completed, a wetting agent such as Ultrawet 60L (Atlantic Refining Company) may be added to this colloidal silica-zircon slurry to impove flowability, and to improve wettability of the slurry onto the pattern. To minimize foaming when a wetting agent is used the quantity should not exceed 0.05 percent by weight of the colloidal silica.

The zircon slurries will function over a wide range of the viscosities. The viscosities obtained at 80°F. with a No. 4 Zahn Viscosimeter are in the rang of 11-21 seconds and more preferably in the range of 15-17 seconds.

Molochite

The molochite employed in the zircon-molochite slurry systems is a coarser flour than the No. 3 zircon flour. This flour (No. 6. Molochite, from Casting Supply House) is defined as being -200 mesh since approximately 75 percent will pass the 200 mesh screen. No 6 Molochite is mixed with colloidal silica binder to make slurries for the back-up or follow-up coats.

The silica sol-molochite slurry is made in the same manner as the silica sol-zircon slurries. No wetting agent is required since molochite is only about half as dense as zircon. Only a few hours of mixing are required to attain slurry equilibrium. The best slurry working temperature is in the range of 75°-85°F. At 80°F. viscosity of the silica sol-mollochite slurry obtained with a No. 4 Zahn cup should be 7-14 seconds and more preferably 10-11 seconds.

Fused Silica

Two different particle sizes of "Nalcast" fused silica (Nalco Chemical Company) can be used for dip slurries. These are "Nalcast" P1W fused silica flour and "Nalcast" P-2 fused silica flour.

"Nalcast" P1W flour has a wide particle size distribution and is used with colloidal silica sol to prepare thick slurries for the inner or prime shell coats. "Nalcast" P1W is defined as "-200 mesh since all the grains will pass through a 200 mesh sieve and approximately 75 percent will pass a 325 mesh sieve.

In making the silica sol-"Nalcast" P1W xlurry the silica sol is added along with the calculated amount of water to the mixing container. WIth good agitation about 85 percent of the calculated "Nalcast" P1W flour will stir in readily. The last portion is added in small increments. The use of efficient mixing equipment will permit the preparation of a suitable slurry in a few hours. The stirrer should be stopped for periods to allow the entrapped air bubbles to rise to the surface and break. Care should be taken that stirring is not carried out with excessive shear such that the slurry overheats from the friction generated. The best slurry working temperatures is 75°-85 °F.

After mixing is completed a wetting agent such as Ultrawet 60L may be added to the slurry to improve flowability and wettability of the slurry onto the pattern. To minimize foaming the quantity of wetting agent should not exceed 0.05 percent by weight of the colloidal silica. This colloidal silica-fused silica slurry will function over a wide range of viscosity, but a suitable viscosity measured with a No. 4 Zahn cup at 80°F. ranges from 25-35 seconds and more preferably 29-31 seconds.

"Nalcast" P-2 flour is a coarser powder than "Nalcast" P1W and is defined as -100 mesh since all will pass through a 100 mesh screen and approximately 45 percent will pass a 325 mesh screen. "Nalcast" P-2 flour is used with the colloidal silica sol binder to make a slurry for forming the back-up or outer shell coats.

The colloidal silica sol-"Nalcast" P-2 slurry is made in the same manner as the corresponding "Nalcast" P1W slurry. However, the "Nalcast" P-2 slurry is easier to mix because "Nalcast" P-2 flour is coarser than "Nalcast" P1W and the slurry is made less viscous. No wetting agent is needed for the slurry. The slurry viscosity as determined on the No. 4 Zahn cup at 80°F. is in the range 12-25 seconds and more preferably in the range 15-18 seconds.

It is of course possible to use the same slurry for both prime and back-up coats. This is illustrated in Example 14, wherein a "Nalcast" P1W slurry is used for both prime and back-up coats.

The broad ranges of composition along with the more preferred ranges of compositions for prime and back-up coats in both the zircon-molochite and "Nalcast" fused silica systems just discussed are given in Tables I and II.

TABLE I

Zircon-molochite system

| Prime Coat Slurry | Composition Parts by Weight | |
|---|---|---|
| | Broad Range | Preferred range |
| Zircon refractory flour, 325 Mesh | 86-50 | 86-67 |
| Colloidal Silica aquasol | 14-50 | 14-33 |
| Ultrawet 60L | 0.05 parts per | 0.05 parts per |

| | 100 parts SiO₂ Max. | 100 parts SiO₂ Max. |
|---|---|---|
| Extra Water | As needed | None |
| pH | 9.6–9.9 | 9.6–9.9 |
| Viscosity, No. 4 Zahn Cup, Sec. | 11–21 | 14–18 |
| Colloidal particle to refractory Flour Ratio | 0.05–0.30 | 0.05–0.15 |

| Back-Up Slurry | Composition, parts by weight | |
|---|---|---|
| | Broad Range | Preferred Range |
| Molochite refractory flour, 200 mesh | 75–50 | 65–50 |
| colloidal silica aquasol | 25–50 | 35–50 |
| Extra Water | As Needed | None |
| pH | 9.8–10.1 | 9.8–10.1 |
| Viscosity, No. 4 zahn cup, Sec. | 7–14 | 9–12 |
| Colloidal Particle to refractory flour ratio | 0.10–0.335 | 0.16–0.30 |

TABLE II

"Nalcast" slurry systems

| | Composition, Parts by Weight | |
|---|---|---|
| Prime Coat Slurry | Broad Range | Preferred Range |
| "Nalcast" P1W fused silica | 75–60 | 75–69 |
| colloidal silica aquasol | 10–40 | 10–31 |
| Ultrawet 60L | 0.05 per 100 parts SiO₂ sol (Max.) | 0.05 per 100 parts SiO₂ sol (Max.) |
| Extra Water | 15–0.0 | 15–0.0 |
| pH | 9.6–9.9 | 9.6–9.9 |
| Viscosity, No. 4 Zahn cup Sec. | 25–35 | 25–32 |
| collodial particle to refractory flour ratio | 0.04–0.20 | 0.04–0.14 |
| Back-up Slurry | | |
| "Nalcast" P-2 fused silica | 75–53.5 | 75–60 |
| colloidal silica aquasol | 10–46.5 | 25–40 |
| Extra Water | 15–0 | None |
| pH | 9.6–9.9 | 9.6–9.9 |
| Viscosity, No. 4 Zahn Cup, Sec. | 12–25 | 15–19 |
| colloidal particle to refractory flour ratio | 0.04–0.26 | 0.10–0.20 |

Adjustment of the slurries to a suitable working viscosity range is carried out by adding water or refractory flour as needed. In the more preferred ranges of colloidal particle to refractory flour ratios water or refractory flour additions are rarely needed in preparing the slurries, but for the lower ratios some additional water is generally required. Over the working life of the slurries frequent water additions are made to maintain proper consistency in order to compensate for water loss by evaporation.

The working viscosities are low initially and this enhances ready penetration of the slurries into recessed areas or blind cores of patterns providing proper filling with slurry and preventing air entrapment, sometimes obtained with high viscosity slurries.

The pH of the slurries as indicated in the Table is measured with a Beckman Zeromatic II pH meter using a Beckman 39301 glass electrode and Beckman 39402 Calomel reference electrode. The reported pH values are those of the slurries as mixed. These values are not critical and no significant pH change is observed in the working life of the slurries up to several weeks.

In the "Nalcast" fused silica slurries, both the prime coat and back-up coat viscosities are higher than those employed in the zircon-molochite system. However, these fused silica slurry viscosities are less than those normally used in the "Nalcast"-aqueous colloidal silica system. The lower viscosities aid in wetting out and uniformly building up recessed areas and blind cores on wax patterns.

Pattern Materials and Cleaning

Conventional wax and plastic expendable patterns of the object to be reproduced in metal are prepared. These patterns are then affixed to a sprue and runner system giving the usual cluster arrangement needed to produce them in multiple. The pattern assembly or cluster is cleaned with a suitable solvent such as methyl ethyl ketone, trichloroethylene or alcohol mixtures to remove soil and release agents used in their preparation. The solvent-cleaned assembly is dried and as such is ready for dipping in the prime coat slurry. If wettability of the slurry onto the pattern is a problem a 1 to 2 percent "Cab-O-Sil" M-5 (Cabot Corp.) solution in isopropanol provides a thin hydrophilic film which vastly improves wettability. This "Cab-O-Sil" coating, however, must be dried before dipping the pattern assembly into the slurry. "Cab-o-Sil" is a silica aerogel made by flame hydrolysis of silicon tetrachloride.

Although wax and plastics are the preferred expendable pattern materials others such as low-melting tin-bismuth alloys may be employed.

Dipping

In the shell building process a solvent-cleaned, expendable pattern assembly such as wax is first dipped into a bath comprising a negative sol or alkaline ionic silicate solution which may or may not contain a refractory grain. Where a very fine finish is desired on the metal casting this can be obtained by omitting the refractory grain from the prime coat. Ordinarily, however, the prime coat will be a slurry of refractory grain in the colloidal silica sol or alkaline ionic silicate solution. For most metal castings colloidal silica is preferably used rather than alkali metal silicate in at least the prime coat due to refractory problems created by the large amount of alkali in the silicates. For low melting alloys, such as aluminum, brasses and bronzes, however, alkali metal silicates can be used as the binder in the prime coat. Since silicates are less expensive than negative sols their use where possible will decrease cost without increasing shell construction time.

The pattern assembly is dipped and thoroughly wetted in the prime coat, withdrawn, drained, and rotated to insure complete coverage in recessed areas or in blind cores. Stuccoing of the wetted pattern assembly is generally carried out after each dipping operation, usually with a somewhat coarser grain of the same refractory as used in the slurry. Stuccoing is accomplished in the conventional manner by dipping the coated pattern into a fluidized bed of the stucco grain or by sprinkling the stucco grain onto the surface of the coated pattern.

After stuccoing, the stuccoed coatings are chemically set or immobilized by dipping the pattern into a solution or dispersion of the setting agent. Generally a soak time of 5–15 seconds is allowed to insure thorough wetting and penetration of the setting agent. Thorough drainage of the setting agent solution from the pattern is necessary to avoid contamination of the slurry during the following coating step; usually about 5 minutes is allowed. An acceptable alternative which speeds things up is to rinse the coated pattern in water to remove excess agent.

After the prime coat is applied the coated pattern is dipped into the back-up coat slurry, stuccoed, dipped into the setting agent solution, and drained or rinsed. These steps are repeated until a coating of the desired thickness is obtained. Usually about 8 to 10 coats, including prime coat and back-up coats, are used. However, as little as a total of 4 coats or even less can be employed, or as much as 30 coats or more, depending upon wax pattern assembly, pattern size, and configuration. The large number of coats can find application in making shells for massive castings not usually made by the precision investment casting technique.

As mentioned previously, the organic setting agent can be applied to the coated pattern by spraying a solution or dispersion of the setting agent onto the pattern, as well as by dipping the pattern into a setting agent solution or dispersion. As a further alternative, the cationic organic setting agent can be coated onto the surface of a finely divided organic material (e.g., a kaolin, bentonite, or attaplugite clay) in order to modify the surface of the material and give it a positive charge. The modified clay (or other inorganic particulate material) can be suspended in a liquid, and a coated pattern can be dipped into or sprayed with this suspension to set the silica or silicate coating.

Drying

After the final coat is applied the shell assembly is ready for drying. Drying under ambient conditions for 18 to 24 hours is sufficient to drive off the bulk of the water enabling the assembly to be dewaxed without blistering or exhibiting cracks. Forced air drying at 110°F. for 5 hours is also sufficient to evaporate a comparable quantity of water and permit dewaxing of the shell without blistering or exhibiting cracks.

Dewaxing

Dewaxing of the shells may be carried out by the normal procedures available; i.e., flash furnace dewaxing at 1,700°–1,900°F., steam autoclave dewaxing and solvent vapor dissolving of the wax.

Flash dewaxing is carried out by placing the shell assembly in a furnace previously heated at 1,700°–1,900°F. At these temperatures the wax is heated and expands, exerting an internal pressure on the shell structure. This pressure is relieved by the wax melting and running out the pouring cup in the shell assembly and also to a lesser extent permeating into the pores of the structures. Shell assemblies dried under controlled humidity and temperature conditions as well as forced air dried at 100°F. for 5 hours as cited previously, do not exhibit cracks or blisters and are suitable for metal casting.

Steam autoclave dewaxing, like furnace flash dewaxing, also depends on rapid heating of the wax and melting of it to relieve the internal pressure on the shell assembly. As a consequence, after loading the shell assemblies in an autoclave, steam pressure is raised as quickly as possible to promote rapid heating of the wax. Shell assemblies dewaxed in a steam autoclave exhibit crank free and blister free surfaces suitable fo metal casting.

Solvent vapor elimination of the wax in shell assemblies is carried out with trichloroethylene vapor. The solvent is boiled in a lower portion of a degreasing tank and the vapors penetrate the pores of the refractory shell assembly and immediately dissolve the wax faces adjacent to the refractory investment before the heat of the solvent vapors expands the wax. Subsequently the bulk of the wax pattern is melted, but only after the internal pressure on the shell structure is relieved. Shell assemblies in which the wax is removed by the solvent vapor technique exhibit crack free and blister free shells suitable for metal casting.

EXAMPLES

The following examples further illustrate the process and products of this invention. In the examples percentages and parts are by weight unless otherwise specified.

EXAMPLE 1

A shell mold suitable for precision casting of metals is prepared according to the method of this invention in the following manner.

A prime coat slurry is prepared by mixing 325 mesh zircon grain (No. 3 flour, Casting Supply House) with "Ludox" SM–30, an aqueous colloidal silica dispersion and stirring the mixture for 24 hours before use. The composition, having a binder solids-to-zircon ratio of 0.09 is:

| Prime Coat Slurry A | Parts by Weight |
|---|---|
| Zircon flour, 325 mesh | 77.0 |
| "Ludox" SM–30 (30% $SiO_2$) | 23.0 |

In the same manner as back-up coat slurry is prepared by mixing 200 mesh molochite grain (No. 6 flour, Casting Supply House) with "Ludox" SM–30 and stirring for 24 hours before use. The composition, having a binder solids-to-molochite ratio of 0.16, is:

| Back-up Coat Slurry B | Parts by Weight |
|---|---|
| Molochite flour, 200 mesh | 64.5 |
| "Ludox" SM–30 (30% $SiO_2$) | 35.5 |

A wax pattern is cleaned in methyl ethyl ketone, air dried and dipped into a 1 percent solution of "Cab-O-Sil" M–5 in isopropyl alcohol and air dried to make the surface wettable by the basid "Ludox" prime coat A. The pattern is then dipped into prime coat Slurry A until thoroughly wetted, withdrawn and drained of excess slurry and, while still wet, inserted into a fluidized bed containing zircon stucco grain (No. 1 zircon, −80 to +140 mesh, Casting Supply House).

Immediately, without drying, the pattern is dipped into a 15 percent aqueous solution of hexadecyltrimethylammonium chloride, soaked for 15 seconds with gentle swirling to remove excess setting agent.

Similarly, without drying, the pattern is given a back-up coat of Slurry B and stuccoed with molochite grain (−30 to +60 mesh, Casting Supply House) in a fluidized bed. Again, the coating is chemically set with the quaternary ammonium salt reagent as described.

This sequence is repeated six times with back-up coat Slurry B to give a mold approximately three-eighth inch thick within 20 minutes. At no point is sloughing of a coating seen. The two slurries used in this procedure remain stable.

After air drying under ambient conditions for 24 hours the wax is removed from the mold by heating the coated pattern in a melt-out furnace at 1,700° to 1,800°F. for 2–3 minutes. The shell is heated an additional 15–20 minutes to ensure complete removal of carbon.

The mold is free of cracks and other defects and is suitable for metal casting.

Subsequently, AMS 5382 high-temperature alloy (25 percent CR, 10 percent Ni, 8 percent W and the remainder Co, nominal analysis) is poured into the mold to give a sound casting.

EXAMPLES 2 to 5

Example 1 is repeated substituting the listed quaternary ammonium salts in the amounts shown for the hexadecyltrimethylammonium chloride of Example 1.

| Example | Quaternary Salt | % in Water |
|---|---|---|
| 2 | Didodecyldimethylammonium acetate | 10 |
| 3 | Dodecyltrimethylammonium bromide | 30 |
| 4 | Octadecenyltrimethylammonium phosphate | 15 |
| 5 | Tetradecylpyridinium chloride | 20 |

Good molds similar to that obtained in EXample 1 are obtained in each of Examples 2 to 5.

EXAMPLE 6

Example 1 is repeated substituting dodecylamine as a 20 percent solution in isopropanol-water for hexadecyltrimethylammonium chloride of Example 1. A good mold similar to that obtained in Example 1 is produced.

EXAMPLES 7 to 9

Example 1 is repeated substituting the listed amine slats in the amounts shown for the hexadecyltrimethylammonium chloride of Example 1.

| Example | Amine Salt | % in Water |
|---|---|---|
| 7 | Dodecylamine hydrochloride | 15 |
| 8 | Dioctylamine hydrosulfate | 20 |
| 9 | Dimethyldecylamine acetate | 10 |

Good molds similar to that obtained in Example 1 are obtained in each of Examples 7 to 9.

EXAMPLE 10

Example 1 is repeated substituting "Ludox" HS–30 colloidal silica dispersion with an average particle size of about 15 m$\mu$ for "Ludox" SM–30 in Prime Coat Slurry A and Back-Up Coat Slurry B. A good mold similar to that obtained in Example 1 is produced.

EXAMPLE 11

Example 1 is repeated substituting "Ludox" AS, an ammonium stabilized colloidal silica aquasol containing 30 percent $SiO_2$, for "Ludox" SM–30 in Prime Coat Slurry A and Back-Up Coat Slurry B. A good mold similar to that obtained in Example 1 is produced.

EXAMPLE 12

Example 1 is repeated substituting "Ludox" AM, an alumina modified colloidal silica aquasol containing 30 percent $SiO_2$, for "Ludox" SM–30 in Prime Coat Slurry A and Back-Up Coat Slurry B. A good mold similar to that obtained in Example 1 is produced.

EXAMPLE 13

A shell mold is prepared according to the method of this invention in a manner similar to that employed in Example 1.

The zircon prime coat slurry made with "Ludox" SM–30, designated A in Example 1, is used in constructing the mold.

In the manner of Example 1 a back-up coat slurry is prepared. The proportion of ingredients if formulated to give a binder solids-to-refractory grain ratio of 0.30. This is designated back-up coat Slurry C:

| Back-Up Coat Slurry C | Parts by Weight |
|---|---|
| Molochite flour, 200 mesh | 50.0 |
| "Ludox" SM-30 (30% $SiO_2$) | 50.0 |

A shell mold is built up on a wax pattern as described in Example 1 using a 20 percent solution of octadecyltrimethylammonium chloride in a 75/25 water/isorpopnaol mixture to set prime and back-up coatings. Complete fabrication of the shell requires only 15 minutes. The air dried and fired mold is free of cracks and other defects and suitable for casting of metal.

EXAMPLE 14

A shell mold is prepared according to the method of this invention in a manner similar to that described in Example 1.

One slurry is used in this example. It is designated Slurry D and is prepared by mixing 200 mesh "Nalcast" P1W fused silica flour (Nalco Chemical Co.) with "Ludox" SM–30 and stirring for 48 hours before use. Binder solids-to-refractory grain weight ratio is 0.10.

| Slurry D | Parts by Weight |
|---|---|
| "Nalcast" P1W fused silica, 200 mesh | 68.7 |
| "Ludox" SM-30 (30% $SiO_2$) | 22.9 |
| Water | 8.4 |

A shell mold is formed on a clean wax pattern in the manner described in Example 1, except in this case one slurry serves for both prime and back-up coats:

Initially, a prime coat of Slurry D is applied and stuccoed with "Nalcast" S–1 fused silica (Nalco Chemical Co.). The coated pattern then is dipped into a 10 percent aqueous solution of dodecyltrimethyl-ammonium chloride, held for 15 seconds, allowed to drain well for several minutes.

Six back-up coats of Slurry D stuccoed with coarser "Nalcast" S–2 fused silica (Nalco Chemical Co.) then is applied and chemically set in the same way.

Complete fabrication of the shell mold requires 30 minutes. The air dried and fired mold is free of cracks and other defects and is satisfactory for casting of metal.

EXAMPLE 15

A shell mold is prepared according to the method of this invention in a manner similar to that described in Example 1.

The zircon prime coat slurry made with "Ludox" SM–30, designated A in Example 1, is used in constructing the mold in this example.

In addition, a back-up slurry is prepared by mixing 200 mesh molochite grain with a solution of "F" Grade Sodium Silicate (Du Pont Co.) containing 15 percent $SiO_2$ and stirring for 24 hours before use. This composition, designated back-up coat Slurry E, has a binder solids ($SiO_2$)-to-molochite weight ratio of 0.075.

| Back-up Coat Slurry E | Parts by Weight |
|---|---|
| Molochite flour, 200 mesh | 66.7 |
| "F" grade sodium silicate solution (15% $SiO_2$) | 33.3 |

A wax pattern is given a dip coating of Slurry A and stuccoed with No. 1 zircon grain. The coated pattern then is dipped into a 25 percent solution of hexadecyltrimethylammonium chloride, soaked for 15 seconds, and rinsed with water quickly under a tap. Six back-up coats of Slurry E stuccoed with −30 to +60 mesh molechite grain then are applied and chemically set as described.

Formation of the mold requires 20 minutes. The air dried and fired mold has no cracks or other defects and is suitable for casting metals.

EXAMPLE 16

A shell mold is prepared as in Example 15 except Lithium POlysilicate 48 (20 percent $SiO_2$, Du Point Co.) is used in place of sodium silicate in the back-up coat slurry.

The air dried and fired mold is free of cracks and other defects and is suitable for casting metals.

EXAMPLE 17

A shell mold is prepared as in Example 15 except No. 30 Potassium Silicate (20.8 percent $SiO_2$, Du Pont Co.) is used in place of sodium silicate in the back-up coat slurry.

The air dried and fired mold is crack free and gives a metal casting with excellent surface definition.

Although the invention has been described with particular reference to its preferred use in making expendable, refractory shell molds for precision investment casting of metals, it obviously can be adapted to many other useful purposes. In general it can be used to any case where it is desired to provide a high temperature-resistant, heat-insulating layer on the surfaces of an object such as an automobile muffler or manifold. For this purpose the slurry of negative sol or silicate can include any desired refractory insulating material such as expanded perlite. Also the process can be used to provide high temperature-resistant coatings which are heat conductive by including a particulate refractory metal in the slurries. Since the slurries can be of low viscosity the process can be adapted to the manufacture of a variety of intricate refractory shapes on either disposable or permanent cores.

It is frequently desirable to include in the negative sol and/or silicate solution baths a fibrous reinforcing agent to improve the green and fired strength of the resulting laminates and laminate articles. Examples of reinforcing agents which can be used are wollastonite (calcium metasilicate) fibers, Kaowool volcanic rock fibers, Fiberfrax aluminosilicate fibers, glass fibers, and asbestos fibers.

I claim:

1. A rapid process for forming a refractory laminate on the surface of a support structure which comprises:
   a. dipping the structure in a bath comprising at least one member of the group consisting of a sol of negatively charged colloidal particles selected from the group consisting of silica particles and bentonite, attapulgite and kaolinite clay particles and a solution of a quaternary ammonium, sodium, potassium or lithium silicate to form a coating on the surface,
   b. contacting the coated surface with a solution or dispersion of a non-polymeric nitrogen-containing cationic monocationic organic setting agent selected from the group consisting of long chain amines and the organic and inorganic acid salts thereof and substituted onium salts of organic and inorganic acids to firmly set the coating,
   c. removing excess setting agent from the surface, and
   d. repeating steps (a) through (c) in sequence as required to build a refractory laminate of the desired thickness.

2. Process of claim 1 wherein the bath of step (a) is a slurry of particulate refractory material in a sol of negatively charged colloidal silica particles.

3. Process of claim 2 wherein in step (b) the surface is dipped into a solution of the setting agent.

4. A rapid process for forming expendable, refractory shell molds for precision investment casting of metals comprising:
   a. dipping a disposable pattern of the metal casting in a bath comprising at least one member of the group consisting of a sol of negatively charged collidal particles selected from the group consisting of silica particles and bentonite, attapulgite and kaolinite clay particles and a solution of a quaternary ammonium, sodium, potassium or lithium silicate to form a coating on the pattern,
   b. contacting the coated pattern with a solution or dispersion of a non-polymeric nitrogen-containing monocationic organic setting agent selected from the group consisting of long chain amines and the organic and inorganic acid salts thereof and substituted onium salts of organic and inorganic acids to firmly set the coating,
   c. removing excess setting agent from the coated pattern, and
   d. repeating steps (a) through (c) in sequence as required to build a refractory shell mold of the desired thickness.

5. Process of claim 4 wherein the bath of step (a) is a slurry of refractory grain in a sol of negatively charged colloidal silica particles.

6. Process of claim 5 wherein the coated pattern is stuccoed between steps (a) and (b).

7. Process of claim 6 wherein in step (b) the stuccoed pattern is dipped into a solution of the setting agent.

8. Process of claim 7 wherein two slurries of refractory grain in a sol of negatively charged silica particles are used, the first slurry containing relatively fine refractory grain and being used for the prime coat, and the second slurry containing relatively coarse refractory grain and being used for subsequent coats.

9. Process of claim 8 wherein the setting agent is a member of the group consisting of amines and their organic and inorganic acid salts and substituted onium salts of organic and inorganic acids in which there is attached to the amine or onium nitrogen at least one and no more than two alkyl chains of six to 25 carbon atoms.

10. Process of claim 8 wherein the setting agent is a member of the group consisting of amines and their organic and inorganic acid salts in which there is attached to the amine nitrogen at least one, but no more than two, alkyl chains of between eight and 20 carbon atoms and which contain between eight and 40 atoms in total.

11. Process of claim 8 in which the setting agent is a member of the group consisting of n-octylamine, 4-hexylcyclohexylamine, di-n-decylamine, ethyltetradecylamine, p-hexadecyl-N,N-dimethylaniline, dodecylamine, ethyloctylamine, and dimethyldecylamine and their salts with HCl, HBr, HI, $NH_2SO_3H$, $H_2SO_4$, $H_3PO_4$, formic acid, acetic acid, hydroxyacetic acid, citric acid, oxalic acid and partially esterfied $H_2SO_4$ and $H_3PO_4$.

12. Process of claim 8 wherein the setting agent is a member of the group consisting of onium salts of organic and inorganic acids in which there is attached to the onium nitrogen at least one, but no more than two, alkyl chains of between eight and 20 carbon atoms and which contain a total of between 11 and 50 carbon atoms.

13. Process of claim 8 wherein the setting agent is a member of the group consisting of n-octyltrimethylammonium chloride, dodecyldimethylethylammonium bromide, tetradecyldiethylbenzylammonium ethosulfate, dicocodimethylammonium acetate, dodecylbenzyltrimetylammonium chloride, N-eicosylpyridinium bromide, octadecyltrimethylammonium chloride, dodecyltrimethylammonium bromide, 2-pentadecyltrimethylammonium halides, hexadecyltrimethylammonium chloride, didodecyldimethylammonium acetate, lower alkyl substituted imidazolines of tetradecanoic acid, dodecylbenzyltrimethylammonium chloride, cetylpyridinium chloride, oleyl and linoleyltrimethylammonium halides, cetyltrimethylammonium halides, and the quaternary derivatives of alkyl substituted imidazolines of dodecanoic acid.

14. Process of claim 1 wherein the bath of step (a) is a slurry of particulate refractory material in a solution of a quaternary ammonium, sodium, potassium or lithium silicate.

* * * * *